United States Patent [19]

Bokser

[11] Patent Number: 5,133,023

[45] Date of Patent: Jul. 21, 1992

[54] MEANS FOR RESOLVING AMBIGUITIES IN TEXT BASED UPON CHARACTER CONTEXT

[75] Inventor: Mindy R. Bokser, San Francisco, Calif.

[73] Assignee: The Palantir Corporation, Santa Clara, Calif.

[21] Appl. No.: 157,399

[22] Filed: May 19, 1988

Related U.S. Application Data

[62] Division of Ser. No. 787,816, Oct. 15, 1985, Pat. No. 4,754,489.

[51] Int. Cl.[5] .............................................. G06K 9/72
[52] U.S. Cl. ........................................ 382/40; 382/14; 382/36; 382/38
[58] Field of Search ..................................... 281/41–43; 382/14, 15, 36–38, 40; 364/513, 513.5

[56] References Cited

U.S. PATENT DOCUMENTS

| | | | |
|---|---|---|---|
| 3,842,402 | 10/1974 | Ett et al. | 382/40 |
| 4,003,025 | 1/1977 | Hilliard et al. | 382/40 |
| 4,058,795 | 11/1977 | Balm | 382/40 |
| 4,599,693 | 7/1986 | Denenberg | 382/15 |
| 4,754,489 | 6/1988 | Bokser | 382/14 |
| 4,773,099 | 9/1988 | Bokser | 382/14 |
| 4,876,731 | 10/1989 | Loris et al. | 382/40 |

*Primary Examiner*—Jose Couso
*Attorney, Agent, or Firm*—Steven F. Caserza

[57] ABSTRACT

A method of identifying an object within a set of object candidates includes the steps of:
calculating the probability of occurrence of each member of a set of string candidates, wherein each string candidate contains one member of the set of object candidates, the calculating employing formulae using a method of groups and projections; and
identifying one of the objects based on the calculated probability.

5 Claims, 7 Drawing Sheets

FIG 2A

PREFIX

| BLANK | '' |
|-------|-----|

BUFFERED BLOCK OF POSSIBILITY SETS

| 0 O o | n | 1 i l | c 0 O o | n | s |
|-------|---|-------|---------|---|---|

FIG 2B

| BLANK | '' | @ | n | @ | @ | n | s |
|-------|-----|---|---|---|---|---|---|

MEANS FOR RESOLVING AMBIGUITIES IN TEXT BASED UPON CHARACTER CONTEXT

This is a division of application Ser. No. 787,816 filed Oct. 15, 1985 now U.S. Pat. No. 4,754,489.

BACKGROUND

1. Field of the Invention

This invention relates in general to character recognition systems and relates more particularly to such systems having provision for resolving detected ambiguities in sensed characters.

2. Prior Art

A wide variety of pattern recognition systems are known in the art. Each such system optically receives data depicting a pattern to be recognized, and performs certain tasks on this pattern to compare it to known patterns in order to "recognize" the input pattern. A basic flow chart depicting a pattern recognition system is shown in FIG. 1. The input pattern is the pattern which is to be recognized. Digitizer 12 converts input pattern 11 to a series of bytes for storage in system memory 13. These bytes are typically binary in nature, reflecting the fact that input pattern 11 is basically a black and white figure. Digitizers are well known in the art and typically are used in such devices as facsimile machines, electronic duplicating machines (as opposed to optical photocopy machines) and optical character recognition systems of the prior art. Memory 13 can comprise any suitable memory device, including random access memories of well-known design. Segmentation 14 serves to divide the image data stored in memory 13 into individual characters. Such segmentation is known in the prior art, and is described, for example, in "Digital Picture Processing," Second Edition, Volume 2, Azriel Rosenfeld and Avinash C. Kak, Academic Press, 1982, specifically, Chapter 10 entitled "Segmentation".

Feature extraction 15 serves to transform each piece of data (i.e., each character) received from segmentation 14 into a standard predefined form for use by classification means 16, which in turn identifies each character as one of a known set of characters.

Classification means 16 can be any one of a number of prior art identification means typically used in pattern recognition systems, including, more specifically, optical character recognition systems. One such classification means suitable for use in accordance with the teachings of this invention is described in U.S. Pat. No. 4,259,661, issued Mar. 31, 1981 to Todd, entitled "Apparatus and Method for Recognizing a Pattern". Identification means 16 is also described in "Syntactic Pattern Recognition and Applications," K. S. Fu, Prentice Hall, Inc., 1982, specifically, Section 1.6, and Appendices A and B.

Postprocessing means 17 can be any one of a number of prior art postprocessing means typically used in pattern recognition systems, such as described in "n-Gram Statistics For Natural Language Understanding And Text Processing" Suen, IEEE "Transactions on Pattern Analysis and Machine Intelligence," Vol. PAMI-1, No. 2, pp. 164–172, April 1979.

Output means 18 serves to provide data output (typically ASCII, or the like) to external circuitry (not shown).

Brief Description of the Drawings

FIG. 2a is an example of a prefix and a buffered block of possibility sets;

FIG. 2b is an example of a nonrecognition string;

DESCRIPTION OF THE PREFERRED EMBODIMENT

Preprocessing of Reference Data

Computing Character String Probabilities

Figure 1:
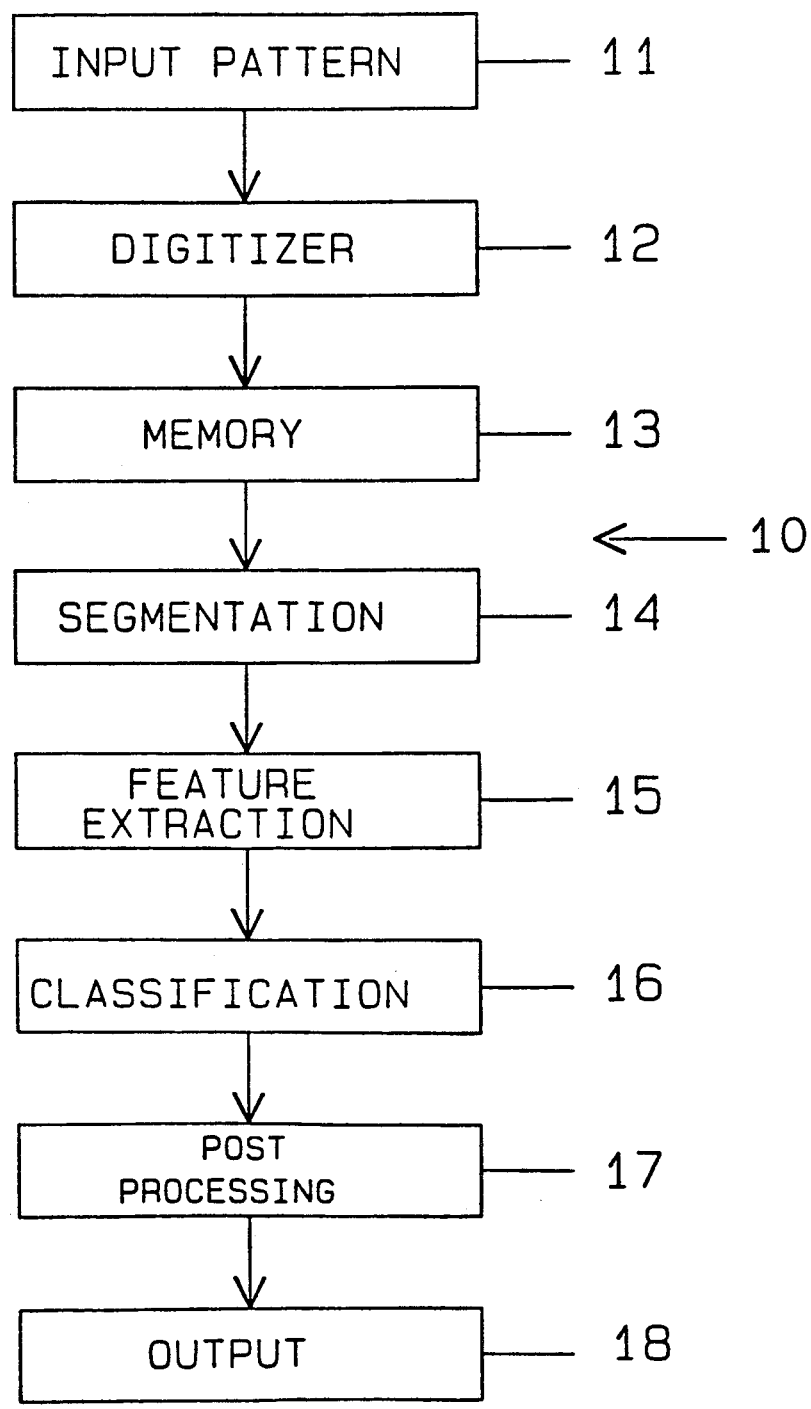
FIG. 1 is a flow chart illustrating a typical prior art pattern recognition system.

The context algorithm employed in the present invention, discussed later, assigns a probability value to each member of a set of character strings in order to determine which character string in the set has the highest probability. As used in this specification, a character string is an ordered list of characters of some selected length. The probability value assigned to a character string is computed by modeling the English language as a second order Markov process. That is $$\begin{aligned}
& P(x_1 x_2 x_3 \ldots x_n) \\
= \; & P(x_1 x_2 x_3) * \\
& P(x_2 x_3 x_4 / x_2 x_3) * \\
& P(x_3 x_4 x_5 / x_3 x_4) * \ldots \\
& P(x_{n-2} x_{n-1} x_n / x_{n-2} x_{n-1})
\end{aligned}$$

where $x_1 x_2 x_3 \ldots x_n$ is a string of n characters In the above equation, $P(A/B)$ denotes the relative probability of the event A given the event B. If, as above, the event A is a subset of the event B, then it is known that $P(A/B) = P(A)/P(B)$. Using this fact, the above equation is rewritten as $$\begin{aligned}
& P(x_1 x_2 x_3 \ldots x_n) \\
= \; & P(x_1 x_2 x_3) * \\
& P(x_2 x_3 x_4) \div \\
& P(x_2 x_3) * \\
& P(x_3 x_4 x_5) \div \\
& P(x_3 x_4) * \ldots \\
& P(x_{n-2} x_{n-1} x_n) \div \\
& P(x_{n-2} x_{n-1})
\end{aligned}$$

For any selected character string, after probability values for the appropriate character digrams and trigrams are obtained, the above equation is used to compute the probability value of the selected character string. As used in this specification, a character digram is a string of two characters, and a character trigram is a string of three characters. The problem of computing a probability value for a character string then reduces to the problem of computing probability values for the character digrams and character trigrams contained in the selected character string.

Computing Trigram/Digram Probabilities

One standard method of obtaining the probability value of any character trigram (digram) is to use a precomputed character trigram (digram) probability table. Such a character trigram probability table is constructed as follows. First, a large body of 'typical' English text is obtained, which is referred to in this specification as the source tape. The character trigram probability table is constructed so as to contain, for each possible character trigram, a value proportional to the number of occurrences of that selected character trigram in the source tape. The character digram probability table is constructed in a similar way.

The method of this invention does not, however, use a character trigram table to obtain the probability of any character trigram, nor does it use a character digram table to obtain the probability value of any character digram. Instead, it uses a total of eight different probability tables, in a manner fully described below, to obtain an estimate for the probability of any character digram or trigram. This is done for two reasons: to minimize memory requirements and to improve statistical significance.

A character trigram probability table containing a probability value for any character trigram would require $N^3*k$ bytes of memory, where N is the number of characters in the character set and k is the number of bytes used to store a single probability value. If, for example, the character set contains 120 different characters and one byte is used to store each probability value, the character trigram probability table would require approximately three megabytes of memory. In the method of this invention, the total amount of memory required to store the eight probability tables is approximately 30K bytes.

As mentioned above, the second problem with using a character trigram (digram) probability table to obtain a probability value for any character trigram (digram) is that the probability values generated by the source tape for low-probability trigrams (digrams) may not be statistically significant due to the limited size of the source tape. For example, referring to Table 1 below, the number of occurrences in the source tape of each of three character trigrams is given.

TABLE 1

| STRING | # OCCURRENCES |
| --- | --- |
| 53¢ | 0 |
| 58¢ | 1 |
| 72¢ | 5 |

The character trigram probability values for these three character trigrams, generated by the source tape, would indicate that '72¢' was five times as probable as '58¢' and that '53¢' was impossible. The method of this invention assigns more statistically significant probability values to low-frequency character digrams and trigrams.

As mentioned above, eight probability tables are computed. A formula is then derived to compute the probability of any character trigram or digram using values stored in these eight probability tables. This formula is referred to in this specification as the 'character ngram probability formula'. Prior to the construction of these tables, the following steps are taken:
  Designate context independent groups
  Designate generic letter independent nonletters
  Define projections onto groups Designate Context Independent Groups Prior to the construction of probability tables, the first step is to designate certain groups of characters as 'context-independent'. As used in this specification, a group of characters is 'context-independent' if the members of the group are assumed to be contextually indistinguishable. That is, a group of characters is context-independent if that group is assumed to satisfy the context independent model, discussed below. In one embodiment, the groups of characters which are designated as context-independent are as given in Table 2 below.

TABLE 2

| Group Name | Characters in Group |
| --- | --- |
| <digit> group | '0', '1', '2' ... '9' |
| <sentence-ending punctuation> group | '!', '?' |
| <currency-suffix> group | '¢', '£', '¥' |
| <arithmetic> group | '+', '=', '÷' |

The context independent model, used in the derivation of the character ngram probability formula, is the statement that $$P(\bar{x}y\bar{z}/\bar{x}g\bar{z}) = P(y/g)$$

where
  $\bar{x}$ and $\bar{z}$ are strings of characters
  g is a context-independent group
  y is a member of g Stated informally, the context-independent model asserts that, given that a character is a member of a particular context-independent group, the probability that it is a particular member of that group is independent of surrounding context.

The context-independent model is illustrated by examining the probability that a particular digit is the number '7' given that the digit is preceded by the letters 'MB':

$$P(<M><B><7>/<M><B><digit>)$$

The model is used to rewrite the above relative probability as follows:

$$P(<M><B><7> / <M><B><digit>)$$
$$= P(<7> / <digit>)$$

The context-independent model asserts that the fact that a digit is preceded by the letters 'MB' has no bearing on the probability that the digit is the number '7'. If, for example, one out of every 10 digits in standard English usage is a '7', that is if $P(<7>/<digit>) = 10\%$, then it is expected that approximately 10% of all strings of the form $<M><B><digit>$ end in the number '7'.

The designation of context independent groups is dependent on the given language. For example, in English, the character '.' is not included in the <sentence-ending punctuation> group consisting of '!' and '?'. This is because the character '.' serves additional syntactic functions and so is sometimes contextually distinguishable from '!' and '?'. For example, the character '.' is sometimes used as a decimal point and so is more likely to separate two digits than either '!' or '?'. In general, characters are grouped, when possible, into the same context-independent group in order to reduce the amount of memory required to store the probability tables and in order to improve the statistical significance of the probabilities generated for low frequency character digrams and trigrams.

Designate Generic Letter Independent Nonletters

Prior to the construction of probability tables, the second step is to designate certain nonletter characters as 'generic letter independent'. As used in this specification, a selected nonletter character is 'generic letter independent' if it is assumed to satisfy the generic letter independent model, discussed below. In one embodiment, all nonletters except blank and apostrophe are designated as generic letter independent. As used in this specification, the <generic letter independent> group is the set of all nonletters which have been designated as generic letter independent.

The generic letter independent model, which is incorporated into the relative independent model discussed later, is the statement that $$P(\bar{x}_1 y \bar{x}_2 / (\bar{x}_1 < g.l.i. > \bar{x}_2)) = P(\bar{k}_1 y \bar{k}_2 / \bar{k}_1 > g.l.i. > \bar{k}_2)$$

where
$\bar{x}_1$ and $\bar{x}_2$ are strings of characters
$\bar{k}_1$ and $\bar{k}_2$ are obtained from $\bar{x}_1$ and $\bar{x}_2$ by replacing all occurrences of letters with the case of those letters
y is a nonletter that has been designated as generic letter independent
<g.l.i.> is the generic letter independent group Stated informally, the generic letter independent model states that, given that a character belongs to the <generic letter independent> group, the probability that it is a particular member of the group is dependent on only the case (i.e., uppercase or lowercase) of the surrounding letters.

This model is illustrated by examining the relative probability that a string of three letters is the string 'MB?' given that the string consists of the letters 'MB' followed by a character in the <generic letter independent> group:

$$P(<M><B><?>/<M><B><g.l.i.>)$$

In this example, the character '?' is assumed, as in one embodiment, to have been designated as generic letter independent. The model is used to rewrite the above probability as follows:

$$P(<M><B><?> / <M><B><g.l.i.>)$$
$$= P(<cap><cap><?> / <cap><cap><g.l.i.>)$$
where <cap> is the set of all capital letters The generic letter independent model asserts that the pair of capital letters 'MB' is as likely to be followed by a question mark as is any other pair of capital letters. If, for example, 10% of all character strings of the form <cap><cap><g.l.i.> are strings of the form <cap><cap><?>, then it is concluded that approximately 10% of all character strings of the form <M><B><g.l.i.> are strings of the form <M><B><?>.

The designation of certain non-letter characters as generic letter independent is dependent on the given language. For example, in English, the character apostrophe is not designated as generic letter independent. This is because the character apostrophe is more likely to separate certain pairs of letters (such as 'n' and 't') than other pairs of letters (such as 'e' and 'm'). In general, nonletters are assumed to be generic letter independent whenever possible in order to reduce the amount of memory required to store the probability tables, discussed later, and to improve the statistical significance of the probabilities generated for low frequency character trigrams.

Groups and Projections

The third and final step prior to the construction of probability tables is the creation of groups and projections. As used in this specification, a projection is a mapping from a set of characters (domain of the projection) onto a set of character groups (range of the projection) with the following properties:

1. Each selected character in the domain of the projection is mapped onto a character group that contains the selected character.
2. No two groups in the range of the projection contain the same character.

Also as used in this specification, a character group containing a single character is referred to as an 'identity' group.

A letter projection is a projection from the set of all letters onto a set of letter groups. In one embodiment, four letter projections are defined. These are:
letter-identity projection
letter-generic letter projection
letter-smallcap projection
letter-letter projection The letter-identity projection maps each letter onto its corresponding identity letter group. The identity letter groups are

| | | | |
|---|---|---|---|
| <a> | group | = | {'a'} |
| <b> | group | = | {'b'} |
| ... | | | |
| <z> | group | = | {'z'} |
| <A> | group | = | {'A'} |
| <B> | group | = | {'B'} |
| ... | | | |
| <Z> | group | = | {'Z'} |

Thus, for example, the letter-identity projection of the character lower-case 'e' is the <e> group.

The letter-generic letter projection maps each letter onto its corresponding generic letter group. The generic letter groups are:

| | | |
|---|---|---|
| <generic a> | = | {'a', 'A'} |
| <generic b> | = | {'b', 'B'} |
| ... | | |
| <generic z> | = | {'z', 'Z'} |

Thus, for example, the letter-generic letter projection of both lowercase 'e' and uppercase 'E' is the <generic e> group.

The letter-smallcap projection maps all lower-case letters onto the <small> group and all upper-case letters onto the <cap> group.

Finally, the letter-letter projection maps all letters onto the single <letter> group.

A nonletter projection is a projection from the set of all nonletters onto a set of nonletter groups. In one embodiment, three nonletter projections are defined. These are:
nonletter-identity projection
nonletter-fine projection
nonletter-coarse projection The nonletter-identity projection maps each nonletter onto its corresponding identity group. Thus, for example, the nonletter-identity projection of '?' is the <?> group.

The nonletter-fine projection maps each nonletter onto either a context-independent group of nonletter characters or an identity group. That is, if a selected nonletter is a member of a group of nonletter characters which was designated, as described earlier, as a context-independent group, then that selected character is mapped onto that context-independent group. Otherwise, the selected character is mapped onto an identity group containing that single character. In one embodiment the groups <digit> group, <sentence-ending punctuation> group, <currency-suffix> group, and <arithmetic> group are, as earlier discussed, the groups designated as context-independent. Thus, in this embodiment, the nonletter-fine projection maps all digits onto the <digit> group, the characters '!' and '?' onto the <sentence-ending punctuation> group, the characters '¢', '¥' and '£' onto the <currency-suffix> group, the characters '+', '=', '÷' onto the <arithmetic> group, and all other nonletters onto identity groups.

The nonletter-coarse projection maps each nonletter which has been designated, as earlier discussed, as generic letter independent, onto the <generic letter independent> group and maps each nonletter that has not been designated generic letter independent (i.e., has been designated as generic letter dependent) onto an identity group containing that selected character. As discussed earlier, in one embodiment the characters blank and apostrophe are designated as generic letter dependent and all other nonletters are designated as generic letter independent. Thus, in this embodiment, the nonletter-coarse projection maps the character blank onto the <blank> group, the character apostrophe onto the <apostrophe> group, and all other nonletters onto the <generic letter independent> group.

The four letter projections and three non-letter projections are combined into nine different character projections. These are:
1. letter-identity/nonletter-coarse
2. letter-identity/nonletter-fine
3. letter-genericletter/nonletter-coarse
4. letter-genericletter/nonletter-fine
5. letter-smallcap/nonletter-coarse
6. letter-smallcap/nonletter-fine
7. letter-letter/nonletter-coarse
8. letter-letter/nonletter-fine
9. letter-identity/nonletter-identity
Thus, for example, the letter-smallcap/nonletter-coarse projection maps the letter lowercase 'e' onto the <small> group and the nonletter '\' onto the <generic letter independent> group.

Probability Tables

Eight probability tables are constructed using a source tape of 'typical' English text. These are:
1. letter-letter/nonletter-coarse trigram table
2. letter-letter/nonletter-coarse digram table
3. letter-genericletter/nonletter-coarse trigram table
4. letter-genericletter/nonletter-coarse digram table
5. letter-smallcap/nonletter-fine trigram table
6. letter-smallcap/nonletter-fine digram table
7. letter-smallcap/nonletter-fine unigram table
8. individual character unigram table The first seven tables are group probability tables. For example, the letter-genericletter/nonletter-coarse trigram table is a three dimensional probability table that contains a probability value for each group trigram of letter-generic/nonletter-coarse groups, such as the group trigrams <generic n><apostrophe><generic t>, <generic t><generic h><generic e>, and <generic t><generic letter independent><generic letter independent>. The last table in the list is a character probability table. For each selected character in the character set, it gives the relative frequency of that character in the source tape.

The method used to construct the first seven probability tables is illustrated by discussing the method used to construct the letter-genericletter/nonletter-coarse trigram table. The other six tables are constructed in a similar manner. First, the source tape of 'typical' English text is converted into a list of letter-generic/nonletter-coarse groups. This conversion takes place by projecting each character in the tape onto its corresponding group using the letter-genericletter/nonletter-coarse projection. Next, for each group trigram, its value in the trigram table is set to the number of occurrences of that group trigram in the converted source tape. Finally, these frequency values are converted into probability (relative frequency) values by dividing each frequency value in the table by the total number of group trigrams in the converted source tape. For example, $$\text{Prob}(<\text{generic 'n'}><\text{apostrophe}><\text{generic 't'}>) = \frac{\text{total \# occurrences}(<\text{generic 'n'}><\text{apostrophe}><\text{generic 't'}>)}{\text{total \# trigrams in source tape}}$$

Relative Independent Model

The derivation of the character ngram probability formula uses the projections defined above together with two models. The first model is the context independent model, discussed earlier. The second model is the relative independent model. One embodiment of the relative independent model states that the letter-genericletter/nonletter-coarse projection and the letter-smallcap/nonletter-fine projection are independent relative to the letter-letter/nonletter-coarse projection. As used in this specification, two projections A and B are independent relative to a third projection C if for any string $\underline{x}$ of characters, $$P(A(\underline{x}) \text{ and } B(\underline{x}) / C(\underline{x}))$$
$$= P(A(\underline{x}) / C(\underline{x})) * P(B(\underline{x}) / C(\underline{x}))$$

As used in this specification, if $\bar{x}$ is a string of characters and D is a projection, the notation $D(\bar{x})$ denotes the string of groups obtained by projecting each character in the string $\bar{x}$ onto a group using the projection D.

Thus, this embodiment of the relative independent model asserts that for any string $\bar{x}$ of characters, $$P(g = c(\bar{x}) \text{ and } sc = f(\bar{x}) / 1 - c(\bar{x}))$$
$$= P(g = c(\bar{x}) / 1 - c(\bar{x}))$$
$$* P(sc = f(\bar{x}) / 1 - c(\bar{x}))$$

where
g−c is the letter-genericletter/nonletter-coarse projection
sc−f is the letter-smallcap/nonletter-fine projection
1−c is the letter-letter/nonletter-coarse projection Stated informally, this relative independent model asserts that:
1. Given a string of characters containing letters, the projection of those letters onto case groups (<small> or <cap>) is independent of the projection of those letters onto generic letter groups.
2. Given that a character is a member of the <generic letter independent> group, knowledge of what the surrounding generic letters are does not assist in computing the probability that the character is a particular member of the <generic letter independent> group.

As is illustrated by an example below, this relative independent model is an extension of the generic letter independent model discussed earlier.

In the derivation of the character ngram probability formula, this relative independent model is used in conjunction with the fact that the letter-genericletter/nonletter-coarse projection and the letter-smallcap/nonletter-fine projection 'span' the letter-identity/nonletter-fine projection. As used in this specification, two projections A and B span a third projection C if any event expressed in terms of the projection C can be reexpressed as the conjunction of events involving A and B. For example, if $\bar{x}$ is the string of characters 'MB7', its letter-identity/nonletter-fine projection is the string of groups <M><B><digit>. The event that a string of characters is of the form <M><B><digit> can be reexpressed as the conjunction of the following two events:
1. The event that the character string is of the form <generic m><generic b><generic letter independent>. Note that this is the letter-genericletter/nonletter-coarse projection of the character string 'MB7'.
2. The event that the character string is of the form <cap><cap><digit>. Note that this is the letter-smallcap/nonletter fine projection of the character string 'MB7'.

That is, the set of all character strings of the form <M><B><digit> is the intersection of the set of all character strings of the form <generic m><generic b><generic letter independent> and the set of all character strings of the form <cap><cap><digit>. As used in this specification, the reexpression of an event expressed in terms of the letter-identity/nonletter-fine projection as the conjunction of events expressed in terms of the letter-genericletter/nonletter-coarse projection and the letter-smallcap/nonletter-fine projection is referred to as the 'expansion' of the original event expressed in terms of the letter-identity/nonletter-fine projection.

Three examples are provided to illustrate the use of the relative independent model.

The first example applies the model to the problem of computing the relative probability that a given string of three characters is the string 'The' given that it is a string of three letters:

$$P(<T><h><e>/<letter><letter><letter>)$$

The relative independent model is used to 'factor' the above relative probability into the product of two relative probabilities as follows.

(I) $\quad P(<T><h><e>/$                 (I.1)
$<letter><letter><letter>)$
$= P(<generic\ t><generic\ h><generic\ e>$ and    (I.2)
$<cap><small><small>/<letter><letter><letter>)$
$= P(<generic\ t><generic\ h><generic\ e>/$        (I.3)
$<letter><letter><letter>)$
$* P(<cap><small><small>/$
$<letter><letter><letter>)$ The justification for reexpressing (I.1) as (I.2) is that the letter-genericletter projection and the letter-smallcap projection span the letter-identity projection. That is, the event $$<T><h><e>$$

is expanded into the conjunction of events

<generic t><generic h><generic e> and
<cap><small><small>

Thus, in going from (I.1) to (I.2), no assumptions about the statistics of the given language are used.

In going from (I.2) to (I.3), the relative independent model is used to approximate the probability (I.2) as the product of two probabilities. The meaning of this model can be better understood if it is first noted that the probability (I.1) can also be expressed as follows:

(II) $\quad P(<T><h><e>/<letter><letter><letter>)$
$= P(<generic\ t><generic\ h><generic\ e>/$
$<letter><letter><letter>)$
$* P(<T><h><e>/$
$<generic\ t><generic\ h><generic\ e>)$ Note that no assumptions about the statistics of the given language are made in (II). The only fact used is the following fact about relative probabilities: If A and B are events with A a subset of B, then $P(A/B) = P(A)/P(B)$. Comparing (I) and (II), it is seen that the relative independent model asserts that:

$P(<T><h><e>/<generic\ t><generic$
$h><generic$
$e>) = P(<cap><small><small>/<letter>$
$<letter><letter>)$ Thus, the relative independent model asserts that if, for example, 10% of all <letter><letter><letter> trigrams are <cap><small><small>, that is if:

$P(<cap><small><small>/<letter><letter>$
$<letter>) = 10\%$ then it is expected that approximately 10% of all <generic t><generic h><generic e> trigrams are cap-small-small, that is $$P(<T><h><e>/<\text{generic t}><\text{generic h}><\text{generic e}>) = 10\%$$

The second example applies the relative independent model to the problem of computing the relative probability:

$$P(<N><\text{apostrophe}><T>/<\text{letter}><\text{apostrophe}><\text{letter}>)$$

The computation proceeds as follows:

$$\begin{aligned}
&P(<N><\text{apostrophe}><T> / \\
&\quad <\text{letter}><\text{apostrophe}><\text{letter}>) \\
&= P(<\text{generic n}><\text{apostrophe}><\text{generic t}> \text{ and} \\
&\quad <\text{cap}><\text{apostrophe}><\text{cap}> / \\
&\quad <\text{letter}><\text{apostrophe}><\text{letter}>) \\
&= P(<\text{generic n}><\text{apostrophe}><\text{generic t}> / \\
&\quad <\text{letter}><\text{apostrophe}><\text{letter}>) \\
&* P(<\text{cap}><\text{apostrophe}><\text{cap}> / \\
&\quad <\text{letter}><\text{apostrophe}><\text{letter}>)
\end{aligned}$$

In a manner similar to that described above in conjunction with the first example, the model asserts that if, for example, 10% of all <letter><apostrophe><letter> strings are <cap><apostrophe><cap> strings, then it is expected that about 10% of all <generic n><apostrophe><generic> strings are of the form <cap><apostrophe><cap>.

In the English language, this relative independent model is most notably violated in the word:

'I'

Though in general, whether or not a character is uppercase is independent of what the generic letter is, this is not true for the string 'I'. That is, though 20% of all <blank><letter><blank> strings may be <blank><cap><blank> strings, it is not the case that approximately 20% of all <blank><generic i><blank> strings are <blank><I><blank>. This case is discussed in more detail later.

The third example illustrates the fact that this relative independent model is an extension of the generic letter independent model discussed earlier. The relative independent model is applied to $$P(<M><B><\text{digit}>/<\text{letter}><\text{letter}><\text{g.l.i.}>)$$

That is, given a string of two letters followed by a nonletter that has been designated as a generic letter independent character, the model is used to compute the probability that the string consists of the letters 'MB' followed by a digit. This is done as follows.

$$\begin{aligned}
(I) \quad &P(<M><B><\text{digit}>/<\text{letter}><\text{letter}><\text{g.l.i.}>) \quad &(I.1)\\
&= P(<\text{generic m}><\text{generic b}><\text{g.l.i.}> \text{ and } <\text{cap}> \quad &(I.2)\\
&\quad <\text{cap}><\text{digit}>/<\text{letter}><\text{letter}><\text{g.l.i.}>) \\
&= P(<\text{generic m}><\text{generic b}><\text{g.l.i.}>/<\text{letter}> \quad &(I.3)\\
&\quad <\text{letter}><\text{g.l.i.}>) \\
&* P(<\text{cap}><\text{cap}><\text{digit}>/<\text{letter}><\text{letter}> \\
&\quad <\text{g.l.i.}>) \quad &(I.3)
\end{aligned}$$

In going from (I.1) to (I.2) the event <M><B><digit> is expanded as the conjunction of events. In going from (I.2) to (I.3) the relative independent model is used. In a manner similar to that described in conjunction with the first example above, the model is seen to assert that $$P(<M><B><\text{digit}>/<\text{generic m}><\text{generic b}><\text{g.l.i.}>) = P(<\text{cap}><\text{cap}><\text{digit}>/<\text{letter}><\text{letter}><\text{g.l.i.}>)$$

That is, if for example 10% of all <letter><letter><generic letter independent> strings are <cap><cap><digit>, then 10% of all <generic m><generic b><generic letter independent> strings are <cap><cap><digit>. The model asserts that whether a given generic letter independent character is, for example, a digit, is independent of the surrounding generic letters. A digit is as likely to follow <generic m><generic b> as it is to follow any other generic letter pair.

Derivation of Character Ngram Probability Formula

The character ngram probability formula is derived for computing the probability of any character digram of trigram using the eight probability tables discussed earlier. The derivation assumes the context independent model and the relative independent model. These models, and hence the derivation itself, can be appropriately modified for languages other than English. The formula derived can be used to compute the probability of a string of characters of any length. For any integer n, the formula can be used to compute the probability of a string of characters of length n. Hence, for any integer n, the formula can be used in conjunction with a context algorithm that models the English language as an nth order Markov process.

In the derivation, $\bar{x}$ is a string of characters of any length. The first step of the derivation expresses the probability of the character string in terms of relative probabilities, using group projections.

$$\begin{aligned}
(I) \quad P(\bar{x}) = &\\
&P(1 - c(\bar{x})) \quad &(I.1)\\
* &P(i - f(\bar{x})/1 - c(\bar{x})) \quad &(I.2)\\
* &P(i - i(\bar{x})/i - f(\bar{x})) \quad &(I.3)
\end{aligned}$$

where $1-c(\bar{x})$ is the letter-letter/nonletter-coarse projection of $\bar{x}$ $i-f(\bar{x})$ is the letter-identity/nonletter-fine projection of $\bar{x}$ $i-i(\bar{x})$ is the letter-identity/nonletter-identity projection of $\bar{x}$ The only fact used here is that if the event A is a subset of the event B, then $P(A/B) = P(A)/P(B)$.

The second step is to rewrite (I.2) above using the fact that the letter-genericletter/nonletter-coarse projection and the letter-smallcap/nonletter-fine projection span the letter-identity/nonletter-fine projection. Thus the letter-identity/nonletter-fine projection is expanded as the conjunction of projections as follows.

$$\begin{aligned}
P(i - f(\bar{x})/1 - c(\bar{x})) \quad &(I.2)\\
= P(g - c(\bar{x}) \text{ and } sc - f(\bar{x})/1 - c(\bar{x}))
\end{aligned}$$

where $g-c(\bar{x})$ is the letter-genericletter/nonletter-coarse projection of $\bar{x}$ $sc-f(\bar{x})$ is the letter-smallcap/nonletter-fine projection of $\bar{x}$ Substituting this identity for (I.2) in (I) above, the following identity is obtained $$(II) \quad P(\bar{x}) =$$

-continued $$P(1 - c(\bar{x})) \quad \text{(II.1)}$$
$$* P(g - c(\bar{x}) \text{ and } sc - f(\bar{x})/1 - c(\bar{x})) \quad \text{(II.2)}$$
$$* P(i - i(\bar{x})/i - f(\bar{x})) \quad \text{(II.3)}$$

The third step applies the relative-independent model in order to replace (II.2) above with the product of two relative probabilities (III.2) and (III.3), as follows $$\text{(III)} \quad P(\bar{x}) =$$
$$P(1 - c(\bar{x})) \quad \text{(III.1)}$$
$$* P(g - c(\bar{x})/1 - c(\bar{x})) \quad \text{(III.2)}$$
$$* P(sc - f(\bar{x})/1 - c(\bar{x})) \quad \text{(III.3)}$$
$$* P(i - i(\bar{x})/i - f(\bar{x})) \quad \text{(III.4)}$$

The fourth step applies the context-independent model to (III.3). This model asserts that all multiple character nonletter-fine groups are context-independent, and hence $$P(i - i(\bar{x})/i - f(\bar{x})) \quad \text{(III.4)}$$
$$= \text{product } \{P(x_i/f(x_i))\}$$

where the product ranges over all characters $x_i$ in the string $\bar{x}$ which are members of context-independent groups. Substituting this identity for (III.4) in (III) above, the following identity is obtained.

$$\text{(IV)} \quad P(\bar{x}) =$$
$$P(1 - c(\bar{x})) \quad \text{(IV.1)}$$
$$* P(g - c(\bar{x})/1 - c(\bar{x})) \quad \text{(IV.2)}$$
$$* P(sc - f(\bar{x})/1 - c(\bar{x})) \quad \text{(IV.3)}$$
$$* \text{product } \{P(x_i/f(x_i))\} \quad \text{(IV.4)}$$

where $f(x_i)$ is the nonletter-fine projection and the product ranges over those $x_i$ for which $f(x_i)$ is a context-independent group.

The fourth and final step is to replace all occurrences in (IV) of $P(A/B)$ with $P(A)/P(B)$ which is justified because in all cases, the event A is a subset of the event B. After making the substitution and cancelling terms, the following equality is obtained.

$$\text{(V)} \quad P(\bar{x}) =$$
$$P(g - c(\bar{x})) \quad \text{(V.1)}$$
$$* P(sc - f(\bar{x})) \quad \text{(V.2)}$$
$$+ P(1 - c(\bar{x})) \quad \text{(V.3)}$$
$$* \text{product } \{P(x_i)\} \quad \text{(V.4)}$$
$$+ \text{product } \{P(f(x_i))\} \quad \text{(V.5)}$$

where the $x_i$ in (V.3) and (V.4) range over all characters in the string $\bar{x}$ which are members of context-independent groups.

The above is the character ngram probability formula used to compute digram and trigram probabilities. A value for each term is determined by looking up the appropriate entry in the appropriate probability table.

Three examples are provided illustrating the steps used in the previous derivation. These steps were:
1. express in terms of projections and relative probabilities
2. expand letter-identity/nonletter-fine projection
3. apply relative independent model
4. apply context independent model
5. express $P(A/B)$ as $P(A)/P(B)$

EXAMPLE #1

The first example runs through the steps necessary to compute the probability of the string 'The':

$$P(<T><h><e>)$$

Step 1

Express in terms of projections and relative probabilities.

$$P(<T><h><e>) =$$
$$P(<letter><letter><letter>)$$
$$* P(<T><h><e>/<letter><letter><letter>)$$
$$* P(<T><h><e>/<T><h><e>)$$

In this example, $P(<T><h><e>/<T><h><e>)$ is equal to one, and hence is dropped from the equation.

Step 2

Expand $<T><h><e>$:

$$P(<T><h><e>) =$$
$$P(<letter><letter><letter>) *$$
$$P(<generic\ t><generic\ h><generic\ e> \text{ and }$$
$$<cap><small><small>/<letter><letter><letter>)$$

Step 3

Apply relative independent model:

$$P(<T><h><e>) =$$
$$P(<letter><letter><letter>)$$
$$* P(<generic\ t><generic\ h><generic\ e>/$$
$$<letter><letter><letter>$$
$$* P(<ap><small><small>/<letter><letter><letter>)$$

Step 4

Apply context independent model:
This step is not applicable because there are no characters in the original string which belong to context independent groups.

Step 5

Replace all probabilities of the form $P(A/B)$ with $P(A)/P(B)$ and cancel terms:

$$P(<T><h><e>) =$$
$$* P(generic\ t><generic\ h><generic\ e>)$$
$$* P<cap><small><small>)$$
$$+ P<letter><letter><letter>)$$

The first probability, $P(<generic\ t><generic\ h><generic\ e>)$, is obtained from the letter-genericletter/nonletter-coarse trigram probability table. The second probability, $P(<cap><small><small>)$, is obtained from the letter-smallcap/nonletter-fine trigram probability table. The third probability, $P(<letter><letter><letter>)$, is obtained from the letter-letter/nonletter-coarse trigram probability table.

EXAMPLE #2

The second example computes the probability of the string 'MB?'

$$P(<M><B><?>)$$

It is assumed, for the sake of illustration, that the character '?' was designated as a member of the generic letter independent group of nonletters by the second model discussed earlier, and was assigned to the context-independent group $<$sentence ending punctuation> group, consisting of the characters '?' and '!', by the first model discussed earlier. The abbreviation <s.e.p.> is used for the <sentence ending punctuation> group. The abbreviation <g.l.i.> is used for the <generic letter independent> group.

Step 1

Express in terms of projections and relative probabilities:

$$P(<M><B><?>) =$$
$$* P(<letter><letter><g.l.i.>)$$
$$* P(<M><B><s.e.p.>/<letter><letter><g.l.i.>)$$
$$* P(<M><B><?>/<M><B><s.e.p.>)$$

Step 2

Expand <M><B><s.e.p.>:

$$P(<M><B><?>) =$$
$$* P(<letter><letter><g.l.i.>)$$
$$* P(<generic\ m><generic\ b><g.l.i.>\ and$$
$$<cap><cap><s.e.p>\ /$$
$$<letter><letter><g.l.i.>)$$
$$* P(<M><B><?>\ /\ <M><B><s.e.p.>)$$

Step 3

Apply relative independent model:

$$P(<M><B><?>) =$$
$$* P(<letter><letter><g.l.i.>)$$
$$* P(<generic\ m><generic\ b><g.l.i.>\ /$$
$$<letter><letter><g.l.i.>)$$
$$* P(<cap><cap><s.e.p.>\ /\ <letter><letter><g.l.i.>)$$
$$* P(<M><B><?>\ /\ <M><B><s.e.p.>)$$

Step 4

Apply context independent model:

$$P(<M><B><?>) =$$
$$* P(<letter><letter><g.l.i.>)$$
$$* P(<generic\ m><generic\ b><g.l.i.>\ /$$
$$<letter><letter><g.l.i.>)$$
$$* P(<cap><cap><s.e.p.>\ /\ <letter><letter><g.l.i.>)$$
$$* P(<?>\ /\ <s.e.p.>)$$

Step 5

Rewrite P(A/B) as P(A)/P(B) and cancel terms:

$$P(<M><B><?>) =$$
$$* P(<generic\ m><generic\ b><g.l.i.>)$$
$$* P(<cap><cap><s.e.p.>)$$
$$\div P(<letter><letter><g.l.i.>)$$
$$* P(<?>)$$
$$\div P(<s.e.p.>)$$

Each of the above probabilities is obtained from the appropriate probability table. The first probability is obtained from the letter-genericletter/nonletter-coarse trigram probability table. The second probability is obtained from the letter-smallcap/nonletter-fine trigram probability table. The third probability is obtained from the letter-letter/nonletter-coarse trigram probability table. The fourth probability is obtained from the character unigram probability table. The fifth probability is obtained from the letter-smallcap/nonletter-fine unigram table.

EXAMPLE 3

The third example computes the probability of the string '53¢':

$$P(<5><3><¢>)$$

For the sake of illustration, it is assumed that '¢' was not assigned to a context-independent group by the first model. It is also assumed that all three characters were assigned to the <generic letter independent> group of nonletters by the second model.

Step 1

Express in terms of projections and relative probabilities:

$$P(<5><3><¢>) =$$
$$P(<g.l.i.><g.l.i.><g.l.i.>)$$
$$* P(<digit><digit><¢>\ /\ <g.l.i.><g.l.i.><g.l.i.>)$$
$$* P(<5><3><¢>\ /\ <digit><digit><¢>)$$

Step 2

Expand <digit><digit><¢>:

$$P(<5><3><¢>) =$$
$$P(<g.l.i.><g.l.i.><g.l.i.>)$$
$$* P(<digit><digit><¢>\ and\ <g.l.i.><g.l.i.><g.l.i.>\ /$$
$$<g.l.i.><g.l.i.><g.l.i.>)$$
$$* P(<5><3><¢>\ /\ <digit><digit><¢>)$$

Step 3

Apply relative independent model:

$$P(<5><3><¢>) = \qquad (1)$$
$$P(<g.l.i.><g.l.i.><g.l.i.>)$$
$$* P(<digit><digit><¢>\ /\ <g.l.i.><g.l.i.><g.l.i.>)$$
$$* P(<g.l.i.><g.l.i.><g.l.i.>)\ /$$
$$<g.l.i.><g.l.i.><g.l.i.>)$$
$$* P(<5><3><¢>\ /\ <digit><digit><¢>)$$

Since (1) above is equal to one it can be dropped from the equation.

Step 4

Apply context independent model:
In this example, the digit group is assumed to be context independent.

$$P(<5><3><¢>) =$$
$$P(<g.l.i.><g.l.i.><g.l.i.>)$$
$$* P(<digit><digit><¢>\ /\ <g.l.i.><g.l.i.><g.l.i.>\ /$$
$$* P(<5>\ /\ <digit>)$$
$$* P(<3>\ /\ <digit>)$$

Step 5

Replace P(A/B) with P(A)/P(B) and cancel terms.

$$P(<5><3><¢>) =$$
$$P(<digit><digit><¢>)$$
$$P(<5>$$
$$\div P(<digit>)$$
$$* P(<3>$$
$$\div P(<digit>)$$

Each of these probabilities is then obtained from the appropriate probability table.

If, in the above example, the character 'c' is assumed to have been assigned to the context-independent group <currency suffix> group, consisting of 'c', '£', and '¥' then, in a manner similar to above, the derivation would have given:

$$P(<5><3><c>) = \\ P(<digit><digit><currency\ suffix>) \\ P(<5>) \\ \div P(<digit>) \\ * P(<3>) \\ \div P(<digit>) \\ * P(<c>) \\ \div P(<currency\ suffix>)$$

Conversion to Confidences

Since multiplication and division are more costly than addition and subtraction, the probability tables are converted into confidence tables prior to the incorporation of these tables into the context module. Each probability value in each probability table is replaced with a number proportional to the logarithm of that probability value. As used in this specification, the logarithm of a probability value is referred to as a confidence value.

The character ngram probability formula is appropriately modified, using logarithms, so that instead of using probability values, it uses confidence values, as follows:

$$\log P(x) = \\ \log P(g - c(x)) \\ + \log P(sc - f(x)) \\ - \log P(1 - c(x)) \\ + \text{sum }\{\log P(x_i)\} \quad (1)\\ - \text{sum }\{\log P(f(x_i))\} \quad (2)$$

where the $x_i$ in (1) and (2) range over all characters in the string $\bar{x}$ which are members of context-independent groups.

As used in this specification the above formula is referred to as the character ngram confidence formula.

Similarly, the formula used to compute the probability of any character string is appropriately modified, using logarithms, so that instead of using probability values of character trigrams and digrams, it uses their confidence values, as follows:

$$\log P(x_1 x_2 x_3 \ldots x_n) = \\ \log P(x_1 x_2 x_3) + \\ \log P(x_2 x_3 x_4) - \\ \log P(x_2 x_3) + \\ \log P(x_3 x_4 x_5) - \\ \log P(x_3 x_4) + \ldots \\ \log P(x_{n-2} x_{n-1} x_n) - \\ \log P(x_{n-2} x_{n-1})$$

The input to the context module is either a single character or a set of more than one character candidates. If the input is a set of more than one character candidate then, as used in this specification, each character candidate in the set is referred to as 'ambiguous'. In one embodiment, associated with each ambiguous character candidate is an 'a priori confidence value' which is set by previous modules, such as the classification module, to a value proportional to the logarithm of the probability that the unknown input character is the character candidate, as that probability was determined by such previous modules. In this embodiment, the a priori confidence values are incorporated into the computation of the probability of a character string as follows:

$$\log P(x_1 x_2 x_3 \ldots x_n) = \\ \log P(x_1 x_2 x_3) + \\ \log P(x_2 x_3 x_4) - \\ \log P(x_2 x_3) * \\ \log P(x_3 x_4 x_5) - \\ \log P(x_3 x_4) + \ldots \\ \log P(x_{n-2} x_{n-1} x_n) - \\ \log P(x_{n-2} x_{n-1}) + \\ \text{sum }\{\text{conf}(x_i)\} \quad (1)$$

where the sum in (1) ranges over those characters in the string which were ambiguous and conf $(x_i)$ is the a priori confidence of $x_i$

OVERALL OPERATION OF CONTEXT ALGORITHM

Figure 3:
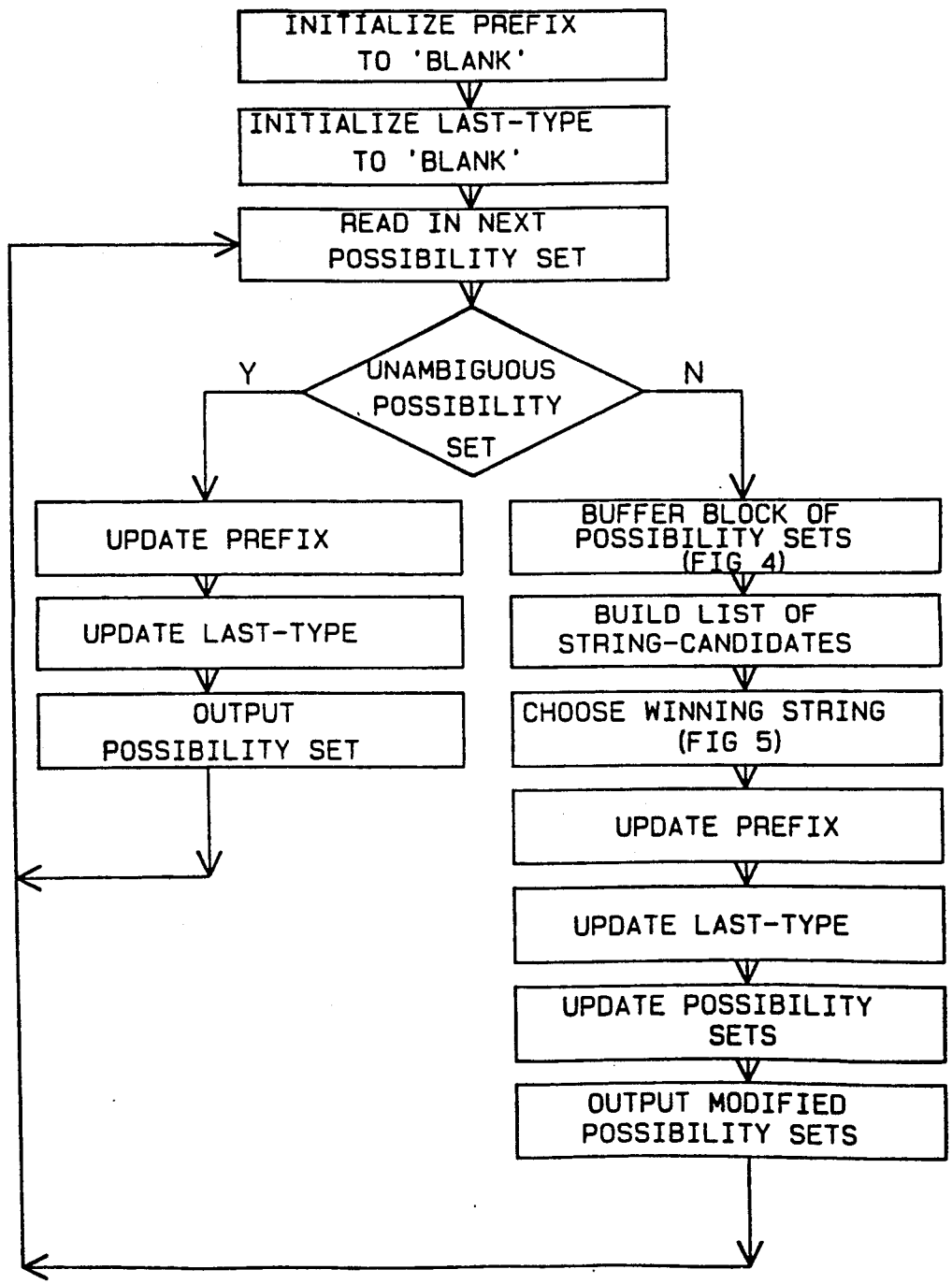
FIG. 3 is a flow chart depicting the overall operation of the context module.

FIG. 3 is a flowchart describing the overall operation of one embodiment of this invention. The operation begins with two initialization steps. The first initialization step stores the single character 'blank' in the prefix buffer. In general, the prefix buffer stores the last two characters output by the context module. However, if the last character output was the character 'blank', or if no characters have yet been output, then the prefix stores the single character 'blank'. The second initialization stage sets the last character type buffer to 'miscellaneous'. The last character type buffer stores information pertaining to the type of the last nonmiscellaneous character read. The character types are either letter, digit, or miscellaneous (all characters other than letters and digits). In one embodiment, this buffer is used to assist in choosing between the word 'I' and the word 'l'.

Next, possibility sets are sequentially read. A possibility set contains one or more characters, together with an associated confidence value, which have been determined to possibly be the next unknown character in the sequence of unknown characters being read. If the possibility set contains a single character which indicates unambiguously that the unknown character is that single character contained in the possibility set, the prefix is updated by including the character contained in the possibility set just read as the most recently read character. The character type buffer is then updated in accordance with the character type of the character contained in the possibility set. The possibility set is then output for use by other circuitry (not shown) and the next possibility set is read.

On the other hand, if the possibility set read is not an unambiguous possibility set containing a single character, the context operation is performed in order to determine which of the characters contained in the possibility set is most likely the unknown character being read and thus which should be the sole character remaining in the possibility set for output.

Figure 4:
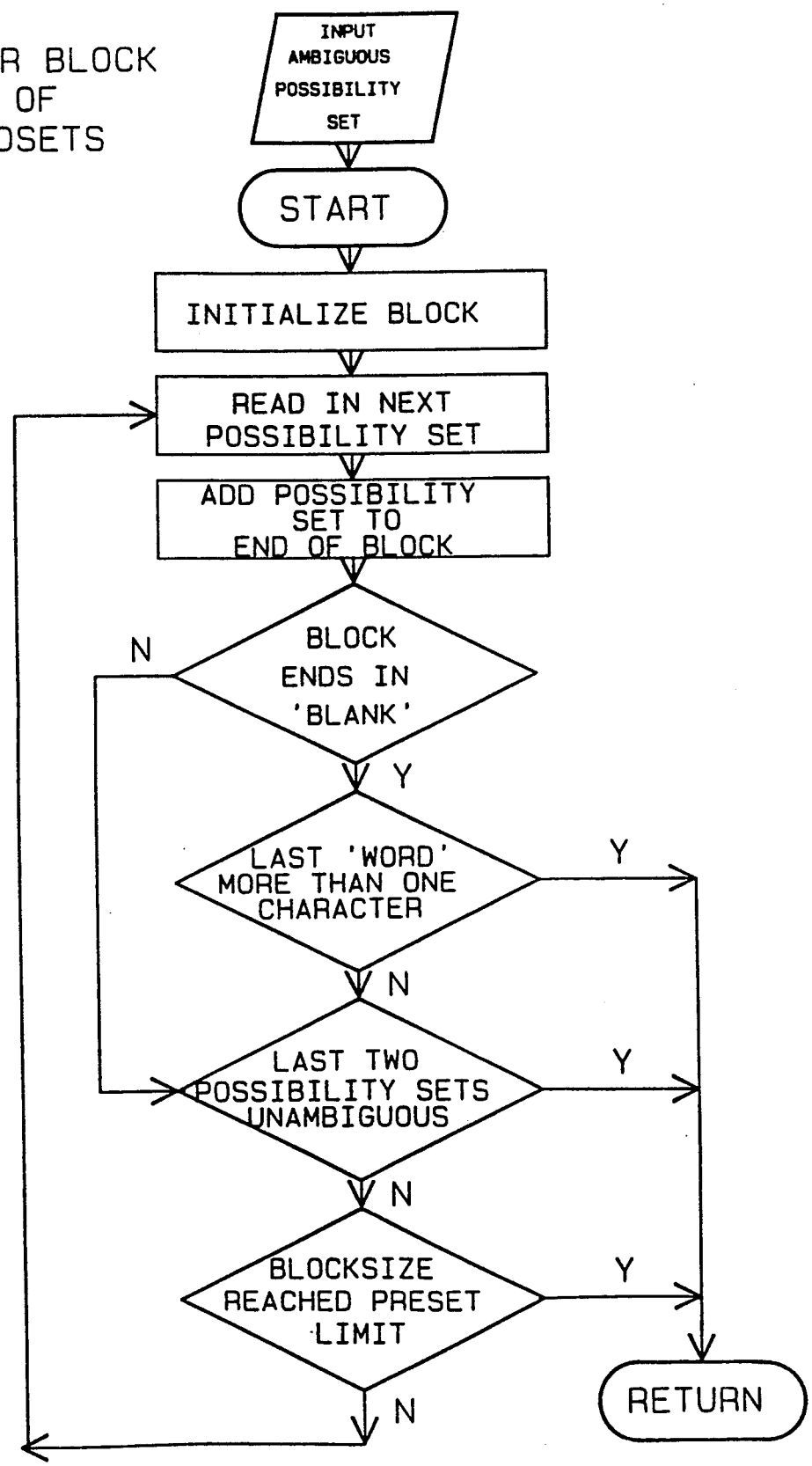
FIG. 4 is a flow chart depicting the operation of buffering a block of possibility sets.

In this event, a block of possibility sets is buffered, as is more fully described in conjunction with FIG. 4. The buffered prefix, together with the buffered block of possibility sets, is used to create a list of string candidates containing each permutation of the characters contained in the prefix and the buffered block of possibility sets. Table 3 below depicts the character strings that are created from the prefix and block of possibility sets depicted in FIG. 2a.

TABLE 3

| Character String Candidate | Group String Candidate | Status |
|---|---|---|
| "Onlcns | \<blank\>\<"\>\<digit \>\<small\>\<digit \>\<small\>\<small\>\<small\> | eliminated |
| "OnlOns | \<blank\>\<"\>\<digit \>\<small\>\<digit \>\<digit \>\<small\>\<small\> | eliminated |
| "OnlOns | \<blank\>\<"\>\<digit \>\<small\>\<digit \>\<cap \>\<small\>\<small\> | eliminated |
| "Onlons | \<blank\>\<"\>\<digit \>\<small\>\<digit \>\<small\>\<small\>\<small\> | eliminated |
| "Onicns | \<blank\>\<"\>\<digit \>\<small\>\<small\>\<small\>\<small\>\<small\> | eliminated |
| "OniOns | \<blank\>\<"\>\<digit \>\<small\>\<small\>\<digit \>\<small\>\<small\> | eliminated |
| "OniOns | \<blank\>\<"\>\<digit \>\<small\>\<small\>\<cap \>\<small\>\<small\> | eliminated |
| "Onions | \<blank\>\<"\>\<digit \>\<small\>\<small\>\<small\>\<small\>\<small\> | eliminated |
| "Onlcns | \<blank\>\<"\>\<digit \>\<small\>\<small\>\<small\>\<small\>\<small\> | eliminated |
| "OnlOns | \<blank\>\<"\>\<digit \>\<small\>\<small\>\<digit \>\<small\>\<small\> | eliminated |
| "OnlOns | \<blank\>\<"\>\<digit \>\<small\>\<small\>\<cap \>\<small\>\<small\> | eliminated |
| "Onlons | \<blank\>\<"\>\<digit \>\<small\>\<small\>\<small\>\<small\>\<small\> | eliminated |
| "Onlcns | \<blank\>\<"\>\<cap \>\<small\>\<digit \>\<small\>\<small\>\<small\> | eliminated |
| "OnlOns | \<blank\>\<"\>\<cap \>\<small\>\<digit \>\<digit \>\<small\>\<small\> | eliminated |
| "OnlOns | \<blank\>\<"\>\<cap \>\<small\>\<digit \>\<cap \>\<small\>\<small\> | eliminated |
| "Onlons | \<blank\>\<"\>\<cap \>\<small\>\<digit \>\<small\>\<small\>\<small\> | eliminated |
| "Onicns | \<blank\>\<"\>\<cap \>\<small\>\<small\>\<small\>\<small\>\<small\> | contender |
| "OniOns | \<blank\>\<"\>\<cap \>\<small\>\<small\>\<digit \>\<small\>\<small\> | eliminated |
| "OniOns | \<blank\>\<"\>\<cap \>\<small\>\<small\>\<cap \>\<small\>\<small\> | eliminated |
| "Onions | \<blank\>\<"\>\<cap \>\<small\>\<small\>\<small\>\<small\>\<small\> | contender |
| "Onlcns | \<blank\>\<"\>\<cap \>\<small\>\<small\>\<small\>\<small\>\<small\> | contender |
| "OnlOns | \<blank\>\<"\>\<cap \>\<small\>\<small\>\<digit \>\<small\>\<small\> | eliminated |
| "OnlOns | \<blank\>\<"\>\<cap \>\<small\>\<small\>\<cap \>\<small\>\<small\> | eliminated |
| "Onlons | \<blank\>\<"\>\<cap \>\<small\>\<small\>\<small\>\<small\>\<small\> | contender |
| "onlcns | \<blank\>\<"\>\<small\>\<small\>\<digit \>\<small\>\<small\>\<small\> | eliminated |
| "onlOns | \<blank\>\<"\>\<small\>\<small\>\<digit \>\<digit \>\<small\>\<small\> | eliminated |
| "onlOns | \<blank\>\<"\>\<small\>\<small\>\<digit \>\<cap \>\<small\>\<small\> | eliminated |
| "onlons | \<blank\>\<"\>\<small\>\<small\>\<digit \>\<small\>\<small\>\<small\> | eliminated |
| "onicns | \<blank\>\<"\>\<small\>\<small\>\<small\>\<small\>\<small\>\<small\> | contender |
| "oniOns | \<blank\>\<"\>\<small\>\<small\>\<small\>\<digit \>\<small\>\<small\> | eliminated |
| "oniOns | \<blank\>\<"\>\<small\>\<small\>\<small\>\<cap \>\<small\>\<small\> | eliminated |
| "onions | \<blank\>\<"\>\<small\>\<small\>\<small\>\<small\>\<small\>\<small\> | contender |
| "onlcns | \<blank\>\<"\>\<small\>\<small\>\<small\>\<small\>\<small\>\<small\> | contender |
| "onlOns | \<blank\>\<"\>\<small\>\<small\>\<small\>\<digit \>\<small\>\<small\> | eliminated |
| "onlOns | \<blank\>\<"\>\<small\>\<small\>\<small\>\<cap \>\<small\>\<small\> | eliminated |
| "onlons | \<blank\>\<"\>\<small\>\<small\>\<small\>\<small\>\<small\>\<small\> | contender |

The block contains three ambiguous possibility sets. The first two ambiguous possibility sets contain three character candidates each. The third ambiguous poset contains 4 character candidates. Thus there are 3×3×4=36 candidate strings. These 36 candidate strings are listed in the first column of Table 3. The second and third columns of Table 3 are discussed later in conjunction with the prescan operation of FIG. 7.

Figure 5:
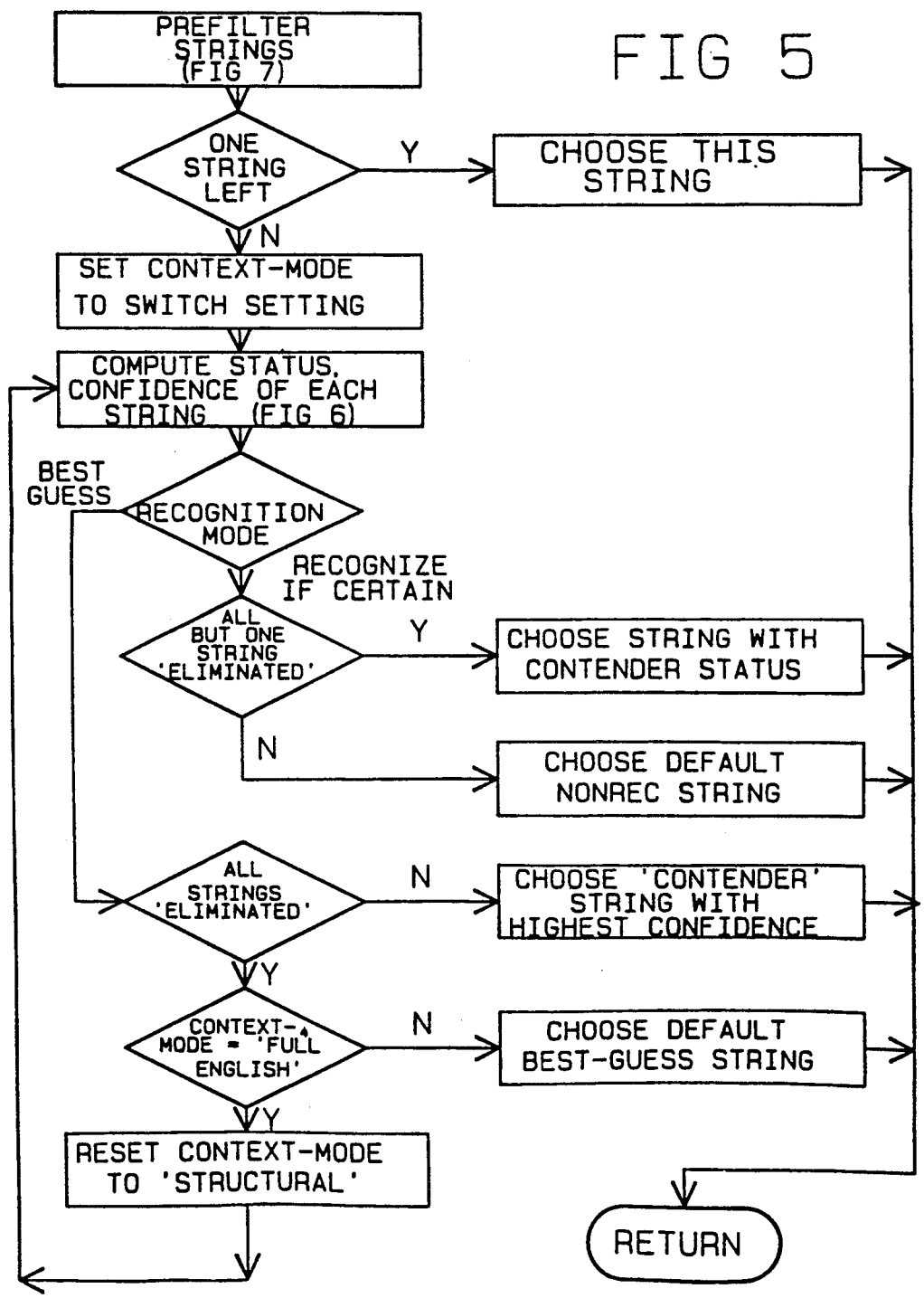
FIG. 5 is a flow chart depicting the operation of choosing the winning string.

Next, the "winning" string of the string candidates contained in the list just prepared is determined, as is described in conjunction with FIG. 5. With the winning string selected, the prefix is updated to include the two most recently read characters. However, if the most recently read character is a blank, the prefix is initialized to a single blank character. Also, the last character type buffer is updated to correspond with the character type associated with the last nonmiscellaneous character read. Each ambiguous possibility set (i.e. a possibility set containing more than one possible character) contained in the block of possibility sets is then modified to contain only that single character associated with that possibility set and the winning string candidate. The possibility sets contained in the block of possibility sets are then output for use by additional circuitry (not shown). The operation is then reiterated by reading in the next possibility set, determining if the possibility set is unambiguous, etc.

BUFFER BLOCK OF POSSIBILITY SETS

FIG. 4 is a flowchart depicting one embodiment of the step of buffering blocks of possibility sets, as described previously in conjunction with FIG. 3 (as shown in the example of FIG. 2a). As shown in FIG. 4, a block, which consists of a plurality of possibility sets, is initialized to include the new, ambiguous possibility set just read. The next possibility set is then read and added to the end of the block. In one embodiment of this invention, if the block ends in a blank character, and the last word (characters separated by a blank) contained in the block contains more than a single character in width (such as the word "I"), the operation of buffering blocks of possibility sets is complete, and the return is made to the operation of FIG. 3. On the other hand, if the block does not end in a blank character, or the last word in the block does not contain more than one character in width, but the last two possibility sets contained in the block are unambiguous (i.e., contain only a single character each), the operation of buffering a block of possibility sets is complete. If not, a final test is made to determine if the size of the block of buffered possibility sets has reached preset limit (in one embodiment 15 possibility sets), in which case the operation of buffering a block of possibility sets is complete. If not, the operation of buffering a block of possibility sets continues with the step of reading in the next possibility set.

In this manner the operation, such as is shown in FIG. 4, stores a plurality of possibility sets in a buffered block for further analysis, commencing with the step of building a list of string candidates (FIG. 3) containing each permutation of the characters contained in the buffered possibility sets.

CHOOSE WINNING STRING

FIG. 5 is a flowchart depicting the step of choosing a winning candidate string, as previously described in conjunction with FIG. 3. First, as is described more fully below in conjunction with the flow chart of FIG. 7, the strings are prefiltered, if desired, for example, in order to eliminate from the list of string candidates certain strings which are highly unlikely.

Following the prefilter operation, a check is made to determine the number of candidate strings left. In the example depicted in Table 3, shown earlier, 28 of the original 36 string candidates have been eliminated by the prefilter operation. These strings are deleted from the list of string candidates. Table 4 depicts the 8 string candidates that remain after the prefilter operation.

TABLE 4

| String Candidate | Status | Confidence |
|---|---|---|
| "Onicns | eliminated | |
| "Onions | contender | 70 |
| "Onlcns | eliminated | |
| "Onlons | contender | 50 |
| "onicns | eliminated | |
| "onions | contender | 65 |
| "onlcns | eliminated | |
| "onlons | contender | 45 |

If exactly one candidate string is left after the prefilter operation, this candidate string is selected as the appropriate string and a return is made to the context algorithm of FIG. 3, which then updates the possibility sets in accordance with the information contained in the single remaining candidate string.

The prefilter operation always leaves at least one string; in one embodiment of this invention, if the prefilter operation would normally delete all candidate strings, the prefilter operation has not assisted in identifying the unknown text being read and thus all string candidates remain.

If more than one string candidate remains, the context mode flag is set to either full language context or structural context. In one embodiment of this invention, the setting of this flag is determined by an operator-actuated switch available on the front panel of the machine. If the context mode flag is set to "full language," then the confidence value assigned to a character digram or trigram is computed using the character ngram confidence formula earlier described. If, on the other hand, the context mode is set to "structural" then the confidence value is computed using the 'structural character ngram formula' which, in one embodiment, is $$\text{Log } P(\bar{x}) = \text{Log } P(sc - f(\bar{x})) - \text{sum } \{\text{Log } (size(sc - f(x_i)))\}$$

where
$\bar{x}$ is a string of candidates
$sc - f(\bar{x})$ is the letter-smallcap/nonletter-fine projection of $\bar{x}$
$x_i$ is a character in the character string $\bar{x}$
size $(sc - f(x_i))$ is the number of characters in the letter-smallcap/nonletter-fine projection group of $x_i$ The character ngram confidence formula uses knowledge of probability statistics in a given selected language. If the input document is written in a language whose probability statistics differ significantly from the probability statistics of the selected language, then the context mode is set to 'structural'. In this mode, the structural character ngram formula is used. Thus, in this mode, knowledge of generic letter digram and trigram probabilities is not used, and the members of any letter-smallcap/nonletter-fine projection group are assumed to be uniformly distributed.

Figure 6:
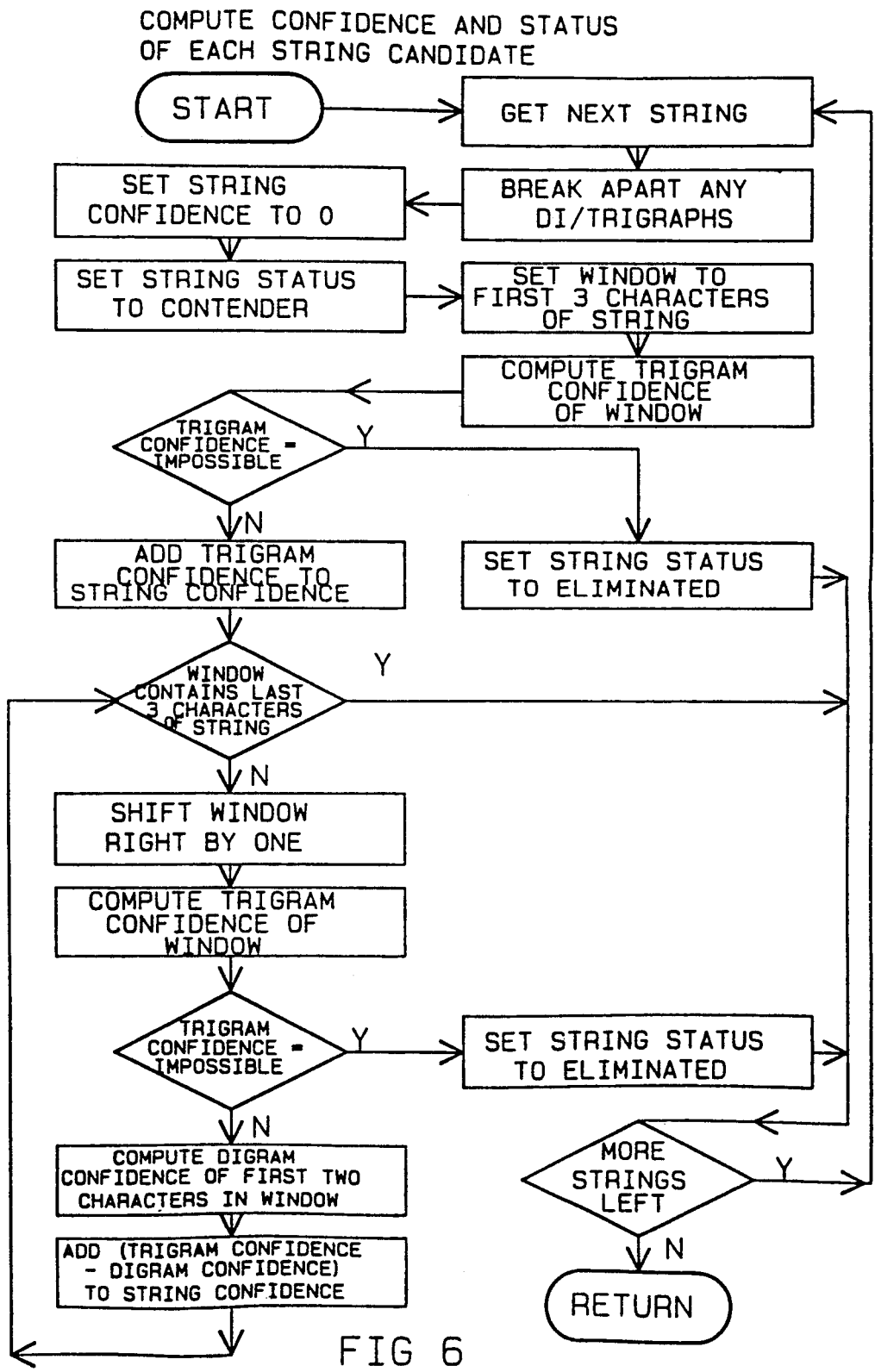
FIG. 6 is a flow chart depicting the operation of computing the confidence and status of each string candidate.

Next, the status (i.e., contender or eliminated) and the confidence value of each string candidate is computed, as is more fully described in conjunction with FIG. 6.

In one embodiment of this invention, a separate flag is available to set the recognition mode as being either "recognize only if certain", or "always take best guess". The setting of this flag is determined by an operator-activated switch available on the front panel of the machine. If this flag is set to "recognize only if certain" and if the context module decides there is some uncertainty as to which character candidate in the possibility set is the correct choice, then the context module outputs a possibility set containing a default, nonrecognition character, such as "@".

Referring again to FIG. 5, if the recognition mode is set to "recognize only if certain," then the number of candidate strings whose status is "contender" is determined. If the number of "contender" strings is equal to one, that is, if all but one candidate string has been eliminated by either the prefilter operation or the compute status and confidence operation, then the remaining string candidate, having its status equal to "contender," is selected as the winning string candidate, and a return is made to the operation of FIG. 3. Conversely, if the recognition mode is equal to the "recognize-only-if-certain" mode, and it is not the case that all but one candidate string has been eliminated, a "nonrecognition string" is created as the winning string. This nonrecognition string is constructed as follows. For each unambiguous possibility set forming the buffer block, the character in the corresponding slot of the nonrecognition string is set equal to the character contained in its corresponding possibility set. The characters in the nonrecognition string corresponding to ambiguous possibility sets (containing more than a single possible character) are set to a default nonrecognition symbol, such as the "@". Referring to Table 4, more than one string candidate has the status value "contender." If the recognition mode is set to the "recognize-only-if-certain" mode, then the nonrecognition string is created as is depicted in FIG. 2b.

On the other hand, if the recognition mode is not set equal to the "recognize-only-if-certain" mode, i.e., the recognition mode is set equal to the "best guess" mode, a decision is made whether all string candidates have been "eliminated". If not, the string candidate whose status is still "contender", and has the highest confidence value, is selected as the winning string candidate, and a return is made to the context operation of FIG. 3. Referring to Table 4, there are 4 candidate strings whose status is "contender." Of these, the string <blank>"Onions is the string with the highest confidence and so is chosen as the winning string. Conversely, if all string candidates have a status of "eliminated", and the context mode is "structured context" rather than "full-language context", the winning string is selected such that each ambiguous character is set equal to the first character contained in the associated possibility set, which corresponds to that character in the associated possibility set having the highest confidence value assigned during the character recognition operation. Conversely, if the context mode is "full-language", the context mode is reset to the "structural-context" mode and another iteration of the choose winning string candidate operation of FIG. 5 is performed, beginning with the step of computing the status and confidence of each string candidate. This reiteration after changing the context mode flag to "structural context" may provide a different result because the confidence of each string candidate is dependent upon the context mode, as has been previously described. In this manner, the context module is able to process input documents containing words that do not conform to the statistics of the selected language. For example, if the input document contains the name "Brznzski"

and, for each 'z' in the above work, the input to the context module is a possibility set containing the characters 'z', 'Z', and '?', then all strings will be assigned a status of 'eliminated' by the first iteration that uses a context mode of 'full language', but the correct string will be selected by the second iteration that uses a context mode of 'structural context'.

Compute Confidence

The compute confidence of string candidate operation of FIG. 5 is now described in more detail in conjunction with the flow chart of FIG. 6. The compute confidence of string candidate operation is called as a subroutine from the choose winning string operation of FIG. 5 and serves to establish a confidence value for each string candidate which has previously been established during the build list of string candidates operation of FIG. 3 and has not been deleted by the prefilter operation of FIG. 7. The first step is to select the first such candidate string. Next, in one embodiment of this invention in which an extended ASCII code is used which includes certain specialized characters such as "ff" and "ffi", these characters are broken down into two and three characters, respectively, in order that each such character may be treated individually. Next, the string confidence is set to zero, and then the string status is set to "contender". A window is set to correspond to the first three characters of the string. Naturally, as will be appreciated by those of ordinary skill in the art, a window other than length 3 can be used, although for windows of greater length, a correspondingly greater amount of memory is required in order to store the corresponding probability tables. Next, the trigram confidence value of the three characters contained within the window is computed according to the the equations previously given. That is, if the context mode is set equal to the "full language" context mode, then the character ngram confidence formula is used. If the context mode is set equal to the "structural" context mode, then the structural character ngram confidence formula is used. Next, if it is determined that the trigram probability is zero (i.e., the trigram is impossible), the status of the string being analyzed is set to "eliminated" and the operation continues if there are further strings to be obtained. If there are no further strings to be obtained, a return is made to the choose winning string algorithm of FIG. 5.

On the other hand, if the trigram probability is not equal to zero, indicating that this trigram is possible, the trigram confidence is added to the string confidence value. As described in this specification, confidence values during this operation are added, since they are stored in probability tables as logarithms of probabilities. Next, it is determined if the window currently contains the last three characters of the string candidate being analyzed. If so, the operation reiterates if there are further strings to be analyzed or makes an exit to the choose winning string operation of FIG. 5 if there are no further string candidates to be analyzed.

On the other hand, if the window does not contain the last three characters of the string, the window is shifted to the right by one character, and the trigram confidence of the characters contained in the window is again computed in accordance with the equations previously described. If the trigram confidence is determined to be impossible, the status of the string candidate being examined is set to "eliminated" and the operation continues if there are any remaining strings to be analyzed. On the other hand, if the trigram confidence is not impossible, the digram confidence of the first two characters in the window is calculated as previously described, and the value equal to the trigram confidence minus the digram confidence is added to the string candidate confidence value in order to provide the logarithm of the relative probability of the characters in the current window given the characters in the previous window, as was earlier described. Next, the operation branches back to the step of determining if the window contains the last three characters of the string, and if not, further analysis is made after shifting the window to the right by one character.

Prefilter

Figure 7:
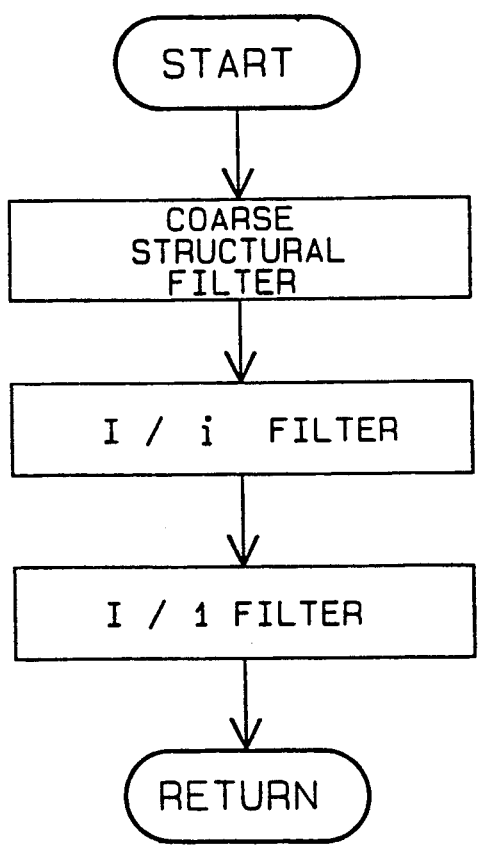
FIG. 7 is a flow chart depicting the prefilter strings operation.

FIG. 7 depicts the prefilter operation discussed earlier in conjunction with the flow chart of FIG. 5.

The first step is the coarse structural filter. The coarse structured filter uses a precalculated coarse structural trigram table, which in one embodiment is constructed as follows. The table has an entry of either 'good' or 'bad' for each trigram of letter-smallcap/nonletter-fine projection groups. The value of a selected group trigram is set to 'good' if the corresponding entry in the letter-smallcap/nonletter-fine trigram probability table indicates that the selected group trigram has a non-zero probability, otherwise the value is set to 'bad'. After this, certain group trigrams are deemed 'structurally improbable' and their values are reset from 'good' to 'bad'. In one embodiment, the following group trigrams are deemed structurally improbable.

TABLE 5

<small> <small> <cap>
<small> <cap> <small>
<small> <cap> <cap>
<cap> <small> <cap>
<cap> <cap> <small>
<small> <small> <digit>
<small> <cap> <digit>
<small> <digit> <small>
<small> <digit> <cap>
<small> <digit> <digit>
<cap> <small> <digit>
<cap> <cap> <digit>
<cap> <digit> <small>
<cap> <digit> <cap>
<cap> <digit> <digit>
<digit> <small> <small>
<digit> <small> <cap>
<digit> <small> <digit>
<digit> <cap> <small>
<digit> <cap> <cap>
<digit> <cap> <digit>
<digit> <digit> <small>
<digit> <digit> <cap>
<blank> <small> <cap>
<blank> <small> <digit>
<blank> <cap> <digit>
<blank> <digit> <small>
<blank> <digit> <cap>

TABLE 5-continued

```
<small><cap   ><blank>
<small><digit ><blank>
<cap  ><digit ><blank>
<digit><small ><blank>
<digit><cap   ><blank>
```

The coarse structural filter operation uses the coarse structural trigram table to assign a temporary status value of either 'contender' or 'eliminated' to each candidate string. This is done as follows. For each selected character candidate string, a corresponding group candidate string is created, using, in one embodiment, the letter-smallcap/nonletter-fine projection. The group candidate string is then examined. If it contains any group trigram whose value, in the coarse structural trigram table, is 'bad', then the temporary status associated with the selected character candidate string is set to "ELIMINATED", otherwise it is set to "CANDIDATE". Referring to Table 3, the temporary status assigned to the string <blank>Onions is set to "eliminated" because the value of the group trigram <digit><small><digit> in the coarse structural trigram table is 'bad'. Of the 36 original character strings in the example depicted in Table 3, 28 are assigned a temporary status value of "eliminated" by the coarse structural filter. After the coarse structural filter operation assigns a temporary status value to each character candidate string, if it is not the case that all strings have been assigned a temporary status value of "eliminated", then those strings whose status value is "eliminated" are deleted. Table 4 depicts those candidate strings which were not deleted by the coarse structural filter operation.

In one embodiment, after the coarse structural filter operation is performed, the next step is the I/i filter operation. In one embodiment, the word 'i' is assigned a higher probability than the word 'I' by the character ngram confidence formula. To prevent the wrong string from being chosen, the I/i filter operation checks to see if there are candidate strings containing 'i' and other candidate strings containing 'I' in the corresponding locations. If so, it deletes those candidate strings containing 'i'.

In one embodiment, after the I/i filter operation is performed, the I/1 filter operation is performed. In one embodiment, the word 'I' is assigned a higher probability value than the word '1'. The I/1 filter operation checks to see if there are candidate strings containing 'I' and other candidate strings containing '1' in the corresponding locations. If so, the I/1 filter operation uses information contained in the prefix, the buffered block of posets, and the last character type buffer to possibly delete all of the candidate strings containing 'I'. In one embodiment, if the last character type is 'digit', or the prefix contains a digit or there is an unambiguous possibility set in the buffered block of possibility sets that contains a digit, then the candidate strings containing 'I' are deleted.

While this specification illustrates specific embodiments of this invention, it is not to be interpreted as limiting the scope of the invention. Many embodiments of this invention will become evident to those of ordinary skill in the art in light of the teachings of this specification. For example, although the method described earlier used projections, models and group probability tables to derive a formula that is used to assign a probability to any character ngram, the present invention can be appropriately modified to assign a probability value to any object ngram where strings of such objects obey statistical rules. For example, the method of this invention can be used in a speech recognition system where an object is a phoneme and certain combinations of phonemes are more probable than other combinations.

I claim:

1. A method for determining a value related to the probability of occurrence, within a reference sequence of occurrences of elements, said elements comprising characters selected from the types of characters consisting of letters, punctuation, digits, blank, and other nonletters, of an input window of N element candidates, comprising the steps of:

for each of a plurality of sets of predefined groups of elements, wherein said groups comprise groups selected from letter groups and nonletter groups and no group contains both letters and nonletters, and wherein for each set of groups of elements an element is assigned to at most one group belonging to said set, associating each element candidate in the input window to one group within each set of groups thereby forming, for each set of groups, an associated window of N groups;

for each set of groups, determining a value related to the probability of occurrence of the associated window of groups in said reference sequence, and computing said value related to the probability of occurrence of said input window by combining the values related to the probability of occurrence of each of said windows of groups to obtain an aggregate window value, wherein for a first selected set of groups of characters:

the letter groups of said set comprise a plurality of generic letter groups of characters, each of said plurality of generic letter groups containing two letters: a specific lowercase character and its associated uppercase character; and the nonletter groups of said set comprise:

a generic letter independent group which contains all and only nonletters which are not substantially more contextually distinguishable from other characters based on the order of generic letter groups and nonletter characters in the reference sequence than on the order of uppercase and lowercase groups and nonletter characters in the reference sequence and which are not substantially useful in contextually distinguishing among generic letters based on the order of characters in said reference sequence, and a plurality of generic letter dependent groups the characters within a generic letter dependent group are contextually indistinguishable from each other based on the order of characters occurring in said reference sequence;

for a second selected set of groups of characters:

the letter groups of said set comprise a first group of characters having the property of being uppercase letters and a second group of characters having the property of being lowercase letters, and each nonletter group is a group having the property that characters contained in said group are substantially not contextually distinguishable from each other based on the order of characters occurring in said reference sequence; and for a third selected set of groups of characters:

said set comprises a letter group containing all letters; and the nonletter groups of said set comprise a generic letter independent group and a plurality of generic letter dependent groups.

2. A method as in claim 1, wherein the step of obtaining an aggregate window value comprises the steps of:

calculating a first value which is the product of the probability of the window of groups associated with said first set and the probability of the window of groups associated with said second set; and dividing said first value by the probability of the window of groups associated with said third set.

3. A method as in claim 2 wherein said step of computing said value related to the probability of occurrence of said input window of element candidates further comprises the steps of:

determining an aggregate unigram value related to the probability of occurrence of each nonletter in the input window; and combining said aggregate unigram value with said aggregate window value to obtain said value related to the probability of occurrence of said input window.

4. A method as in claim 3 wherein said aggregate unigram value is determined by the steps of:

for each nonletter in said input window which is not uniquely specified by the conjunction of the properties of the groups containing said element candidate:

determining a first associated value related to the probability of occurrence of said element candidate in said reference string;

determining a second associated value related to the probability of occurrence in said reference string of a selected group containing said element candidate;

forming a value related to the ratio of said first and second associated values; and combining said values related to obtain said aggregate unigram value.

5. A method as in claim 4, wherein said selected group has the property that its elements are substantially not distinguishable from each other based on the order of elements occurring in said reference sequence.

* * * * *